US007421405B2

(12) United States Patent
Little et al.

(10) Patent No.: US 7,421,405 B2
(45) Date of Patent: Sep. 2, 2008

(54) METHODS AND APPARATUS FOR DEVELOPING INVESTMENTS

(75) Inventors: Douglas James Little, Sydney (AU); Peter Geoffrey Vann, Sydney (AU)

(73) Assignee: Constellation Capital Management Limited, Sydney NSW (AU)

( * ) Notice: Subject to any disclaimer, the term of this patent is extended or adjusted under 35 U.S.C. 154(b) by 1465 days.

(21) Appl. No.: 09/991,914

(22) Filed: Nov. 26, 2001

(65) Prior Publication Data

US 2003/0074295 A1 Apr. 17, 2003

(30) Foreign Application Priority Data

Oct. 8, 2001 (AU) .................................. 78277/01

(51) Int. Cl.
*G06Q 30/00* (2006.01)
(52) U.S. Cl. .......................................... 705/36; 705/36
(58) Field of Classification Search .................... 705/36
See application file for complete search history.

(56) References Cited

U.S. PATENT DOCUMENTS

| 5,761,442 | A |   | 6/1998  | Barr et al.              |
|-----------|---|---|---------|--------------------------|
| 5,819,238 | A | * | 10/1998 | Fernholz ........... 705/36 R |
| 5,946,667 | A | * | 8/1999  | Tull et al. .......... 705/36 R |
| 5,978,778 | A | * | 11/1999 | O'Shaughnessy ..... 705/36 R |
| 6,092,056 | A | * | 7/2000  | Tull et al. .......... 705/36 R |
| 7,174,313 | B1| * | 2/2007  | Martinez ............ 705/36 R |
| 7,177,831 | B1| * | 2/2007  | O'Shaughnessy et al. . 705/36 R |
| 2003/0065602 | A1 | * | 4/2003 | Yip ............................. 705/36 |
| 2005/0060254 | A1 | * | 3/2005 | Jones .......................... 705/36 |

FOREIGN PATENT DOCUMENTS

AU  781699  4/2003
WO  WO 95/27945  10/1995

OTHER PUBLICATIONS

Financial Analysis Journal: "Asset-Pricing Anomalies in Global Industry Indexes", Jul./Aug. 1999, v55n4, pp. 17-37.*
Science Research Associates, Inc. "Online Business Computer Applications", Second Edition, 1987, by Alan L. Eliason.*
FTSE International, "Classifying Members of the Family", Triskel Communications Limited, pp. 2-8, Oct. 1999.
B. Solnik, "Quarterly Focus: Direction for Global Portfolio Management", UBS Asset Management, pp. 1-5, Mar. 31, 2001.

(Continued)

*Primary Examiner*—James P. Trammell
*Assistant Examiner*—Hai Tran
(74) *Attorney, Agent, or Firm*—Finnegan, Henderson, Farabow, Garrett & Dunner, L.L.P.

(57) ABSTRACT

A method for determining weightings of an investment portfolio selected from a plurality of domestic and international financial investments is provided. The method divides domestic and international financial investments into a plurality of industry groups, selecting one of the industry groups, and determining a required industry weighting as well as an available domestic weighting for the selected industry group. A mixture of investments can then be determined based on the required industry weighting and the available domestic weighting, and the process is repeated for all available industry groups.

39 Claims, 5 Drawing Sheets

OTHER PUBLICATIONS

P. Laband "Impact of Globalisation on Approaches to Investing", Constellation Capital, Towers- Perrin, pp. 1-14, Jun. 2001.

E. Kirzner, "Bottom-Up Approach Gains Popularity: Global Investing: Recent Research Points to Merits of Sector Selection", Financial Post, p. 14, Feb. 26, 2001.

"Local Analysis Cedes to Global View", E-Financial News, pp. 1-3, Jun. 25, 2001.

C. Capaul; "Asset-Pricing Anomalies in Global Industry Indexes", Financial Analysts Journal, pp. 17-31, Jul./Aug. 1999.

International Search Report, PCT/AU02/01363.

* cited by examiner

METHODS AND APPARATUS FOR DEVELOPING INVESTMENTS

FIELD OF THE INVENTION

The present invention relates to methods and associated apparatus for developing investments. The invention has been developed primarily for use by investors, for example superannuation funds, pension funds, investment managers, mutual funds, investment companies, insurance companies, etc, as an aid in formulating an investment portfolio in tradable financial investments such as financial instruments, securities, equities, shares, futures, options, warrants, bonds, promissory notes, etc and will be described with reference to this application. Additionally the invention can be applied to a range of investment styles, such as value, growth, index, quantitative, or passive. However it will be appreciated by those skilled in the art that the invention is not limited to this particular field of use.

DISCUSSION OF THE PRIOR ART

Investors generally have the choice of investing funds either domestically, internationally or in a combination of the two. For example, for Australian superannuation funds the current average ratio of domestic equity investments to international equity investments is approximately 60:40. A prior art technique for benchmarking the domestic component of an investment is to compare its performance to that of a domestic benchmark index, for example an applicable Australian index is the ASX/S&P 200 or 300. Similarly, the international component may be benchmarked against a suitable international index excluding the domestic component thereof, for example the MSCI World Index ex Australia.

In many countries the domestic benchmark is dominated by a small number of local companies. For example, in Australia shares in News Corporation represent approximately 10% of the domestic equity market capitalisation. Hence the 60:40 ratio mentioned above would result in a weighting of News Corporation shares of 6% which is out of step with the weight of the global media industry in the world economy. In other words, this may be considered to be an imbalanced exposure.

Additionally, some industries dominate a domestic market whereas others are under represented. For example, the Australian equities market is comparatively over represented in resource based stocks and under represented in industries such as pharmaceuticals and technology.

It is recognised that country or regional influences on equity market returns have been slowly reducing, whereas factors relating to industry groups are typically having an increasing influence on equity markets. This reflects the globalisation of at least some industries. While international investments give rise to diversification benefits, many investors prefer to favour investing within a specific domestic economy, often to support their local industries.

Any discussion of the prior art throughout the specification should in no way be considered as an admission that such prior art is widely known or forms part of common general knowledge in the field.

OBJECT OF THE INVENTION

It is an object of the present invention to overcome or ameliorate at least one of the disadvantages of the prior art, or to provide a useful alternative.

SUMMARY OF THE INVENTION

In accordance with a first aspect of the present invention there is provided a method for determining weightings of an investment portfolio selected from a range of domestic and international financial investments, said method including the steps of:

a) dividing said range of domestic and international financial investments into a plurality of industry based groups;

b) selecting one of said industry based groups;

c) determining a required_industry_weighting for said selected industry based group;

d) determining an available_domestic_weighting for said selected industry based group;

e) determining a mixture of financial investments within said selected industry based group, whereby said mixture consists of:

e1) exclusively said domestic financial investments if said available_domestic_weighting equals or exceeds said required_industry_weighting; otherwise e2) domestic financial investments having a weighting substantially equal to said available_domestic_weighting and international financial investments having a weighting substantially equal to said required_industry_ weighting minus said available_domestic_weighting; and f) repeating steps b) to e) until mixtures of financial investments for all of said industry based groups have been determined, thereby forming the weighting of said investment portfolio.

In one embodiment the domestic equity investments in step e1 have a weighting substantially equal to said required_industry_weighting.

In accordance with a second aspect of the present invention there is provided a method of determining a mixture of financial investments within a pre-selected industry based group, said method including:

a) determining a required_industry_weighting for said pre-selected industry based group;

b) determining an available_domestic_weighting for said pre-selected industry based group;

c) determining the mixture of financial investments within said pre-selected industry based group, whereby said mixture consists of:

c1) exclusively said domestic financial investments if said available_domestic_weighting equals or exceeds said required_industry_weighting; otherwise, c2) domestic financial investments having a weighting substantially equal to said available_domestic_weighting and international equity investments having a weighting substantially equal to said required_industry_weighting minus said available_domestic_weighting.

In accordance with a third aspect of the present invention there is provided a method for determining weightings of an investment portfolio selected from a range of domestic and international financial investments, said method including the steps of:

a) dividing said range of domestic and international financial investments into a plurality of groups;

b) selecting one of said groups;

c) determining a required_industry_weighting for said selected group based upon investor criteria;

d) determining an available_domestic_weighting for said selected group based upon statistical information;

e) determining a mixture of financial investments within said selected group, whereby said mixture consists of:

e1) exclusively said domestic financial investments if said available_domestic_weighting equals or exceeds said required_industry_weighting; otherwise, e2) domestic financial investments having a weighting substantially equal to said available_domestic_weighting and international financial investments having a weighting substantially equal to said required_industry_weighting minus said available_domestic_weighting; and f) repeating steps b) to e) until mixtures of financial investments for all of said groups have been determined, thereby forming the weighting of said investment portfolio.

In one embodiment the statistical information is a domestic benchmark or index and the investor criteria is based upon an international benchmark or index.

In accordance with a fourth aspect of the present invention there is provided a method of determining a spread of investments across i groups of financial investments, each of said groups including domestic financial investments and international financial investments, said method including the following steps for each of the i groups:

a) defining a desired weight ($W^G_i$);

b) determining the weight of domestic financial investments ($W^D_i$);

c) calculating a domestic weight ($w^d_i$) within the spread of investments and a international weight ($w^o_i$) within the spread of investments as follows:

| | |
|---|---|
| $w^d_i = W^G_i$ | if Adequate($W^G_i$, $W^D_i$) = True |
| or | |
| $w^d_i = W^G_i$ − shortfall, | if Adequate($W^G_i$, $W^D_i$) = False |
| and | |
| $w^o_i = 0$ | if Adequate($W^G_i$, $W^D_i$) = True |
| or | |
| $w^o_i$ = shortfall | if Adequate($W^G_i$, $W^D_i$) = False, | whereby Adequate($W^G_i$, $W^D_i$) is a function which returns True if $W^D_i$ is adequate to meet $W^G_i$ in accordance with pre-determined criteria and otherwise returns False; and whereby shortfall=$W^G_i - W^D_i$.

In one embodiment the function Adequate($W^G_i$, $W^D_i$) is defined as follows:

| | |
|---|---|
| Adequate($W^G_i$, $W^D_i$) = True | if $W^G_i < W^D_i$ |
| or | |
| Adequate($W^G_i$, $W^D_i$) = False | if $W^G_i > W^D_i$. |

In another embodiment the function Adequate($W^G_i$, $W^D_i$) is further adapted to take into account additional factors such as appropriateness of exposure and/or excessive exposure criteria.

In accordance with a fifth aspect of the present invention there is provided a method of investing within a selected industry, said method including the steps of:

determining a required weighting within said selected industry;

investing internationally within said selected industry only if a domestic market weight in said industry is less than said required weighting within said industry, otherwise;

investing exclusively domestically within said selected industry.

In accordance with a sixth aspect of the present invention there is provided an apparatus for determining weightings of an investment portfolio selected from a range of domestic and international financial investments, said apparatus including:

a memory for storing said range in a plurality of industry based groups;

an input for definition of a required_industry_weighting for each of said industry based groups;

an input for definition of an available_domestic_weighting for each of said industry based groups;

a data processor for determining a mixture of financial investments within each of said industry based groups, whereby said mixture consists of:

exclusively said domestic financial investments if said available_domestic_weighting equals or exceeds said required_industry_weighting; otherwise domestic financial investments having a weighting substantially equal to said available_domestic_weighting and international financial investments having a weighting substantially equal to said required_industry_weighting minus said available_domestic_weighting; and an output for communication of said mixture of financial investments within each of said industry based groups.

In accordance with a seventh aspect of the present invention there is provided an apparatus for determining a mixture of financial investments within a pre-selected industry based group, said apparatus including:

an input for definition of a required_industry_weighting for said pre-selected industry based group;

an input for definition of an available_domestic_weighting for said pre-selected industry based group;

a data processor for determining the mixture of financial investments within said pre-selected industry based group, whereby said mixture consists of:

exclusively said domestic financial investments if said available_domestic_weighting equals or exceeds said required_industry_weighting; otherwise, domestic financial investments having a weighting substantially equal to said available_domestic_weighting and international equity investments having a weighting substantially equal to said required_industry_weighting minus said available_domestic_weighting; and an output for communication of said mixture of financial investments.

In accordance with an eighth aspect of the present invention there is provided an apparatus for determining weightings of an investment portfolio selected from a range of domestic and international financial investments, said apparatus including:

a memory for storing said range of domestic and international financial investments in a plurality of groups;

an input for defining a required_industry_weighting for each of said groups;

an input for defining an available_domestic_weighting for each of said groups;

a data processor for determining the mixture of financial investments within each of said groups, whereby said mixture consists of:

exclusively said domestic financial investments if said available_domestic_weighting equals or exceeds said required_industry_weighting; otherwise, domestic financial investments having a weighting substantially equal to said available_domestic_weighting and international financial investments having a weighting substantially equal to said required_industry_weighting minus said available_domestic_weighting; and an output for communication of said mixture of financial investments within each of said groups.

In accordance with a ninth aspect of the present invention there is provided an apparatus for determining a spread of investments across i groups of financial investments, each of said groups including domestic financial investments and international financial investments, said apparatus including:

a) an input for defining a desired weight ($W^G_i$) for each of the i groups;

b) an input for defining the weight of domestic financial investments ($W^D_i$) for each of the i groups;

c) a data processor for calculating a domestic weight ($w^d_i$) for each of the i groups within the spread of investments and an international weight ($w^o_i$) for each of the groups within the spread of investments as follows:

| | |
|---|---|
| $w^d_i = W^G_i$ | if Adequate($W^G_i$, $W^D_i$) = True |
| or | |
| $w^d_i = W^G_i$ − shortfall, | if Adequate($W^G_i$, $W^D_i$) = False |
| and | |
| $w^o_i = 0$ | if Adequate($W^G_i$, $W^D_i$) = True |
| or | |
| $w^o_i$ = shortfall | if Adequate($W^G_i$, $W^D_i$) = False, | whereby Adequate($W^G_i$, $W^D_i$) is a function which returns True if $W^D_i$ is adequate to meet $W^G_i$ in accordance with pre-determined criteria and otherwise returns False; and whereby shortfall=$W^G_i - W^D_i$.

In accordance with a tenth aspect of the present invention there is provided an apparatus for investing within a selected industry, said apparatus including:

an input for determining a required weighting within said selected industry;

investing means for investing internationally within said selected industry only if a domestic market weight in said industry is less than said required weighting within said industry, otherwise;

investing exclusively domestically within said selected industry.

In accordance with an eleventh aspect of the present invention there is provided an investment portfolio having weightings determined in accordance with the method and/or the apparatus as described above.

In accordance with a twelfth aspect of the present invention there is provided a mixture of financial investments selected in accordance with the method and/or the apparatus as described above.

In accordance with a thirteenth aspect of the present invention there is provided a spread of investments across i groups of financial investments determined in accordance with the method and/or the apparatus as described above.

In accordance with a fourteenth aspect of the present invention there is provided an investment portfolio having weightings determined in accordance with a benchmark index calculated in accordance with the method and/or the apparatus as described above.

In accordance with a fifteenth aspect of the present invention there is provided a mixture of financial investments within a pre-selected industry based group determined in accordance with a benchmark index calculated in accordance with the method and/or the apparatus as described above.

In accordance with a sixteenth aspect of the present invention there is provided a spread of investments across i groups of financial investments determined in accordance with a benchmark index calculated in accordance with the method and/or the apparatus as described above.

In accordance with another aspect of the present invention there is provided a computer-implemented method for managing investments including domestic and international financial investments represented by companies and divided into business sectors based on a type of business associated with each company, comprising:

selecting a first value associated with a portion of an investment portfolio designated to a business sector and representing an international share of business associated with the business sector; and determining an investment plan for at least the portion of the investment portfolio based on a relationship between the first value and a second value representing a domestic share of business associated with the business sector.

In one embodiment the step of determining an investment plan includes either:

(i) exclusively selecting domestic financial investments for the investment plan when the second value is equal or exceeds the first value; and (ii) selecting for the investment plan domestic financial investments having a weighting substantially equal to the second value and international financial investments having a weighting substantially equal to a difference between the first value and the second value.

BRIEF DESCRIPTION OF THE FIGURES

An embodiment of the invention will now be described by way of example only with reference to the accompanying drawings in which.

EXEMPLARY DETAILED DESCRIPTION OF EMBODIMENTS

Figure 1:
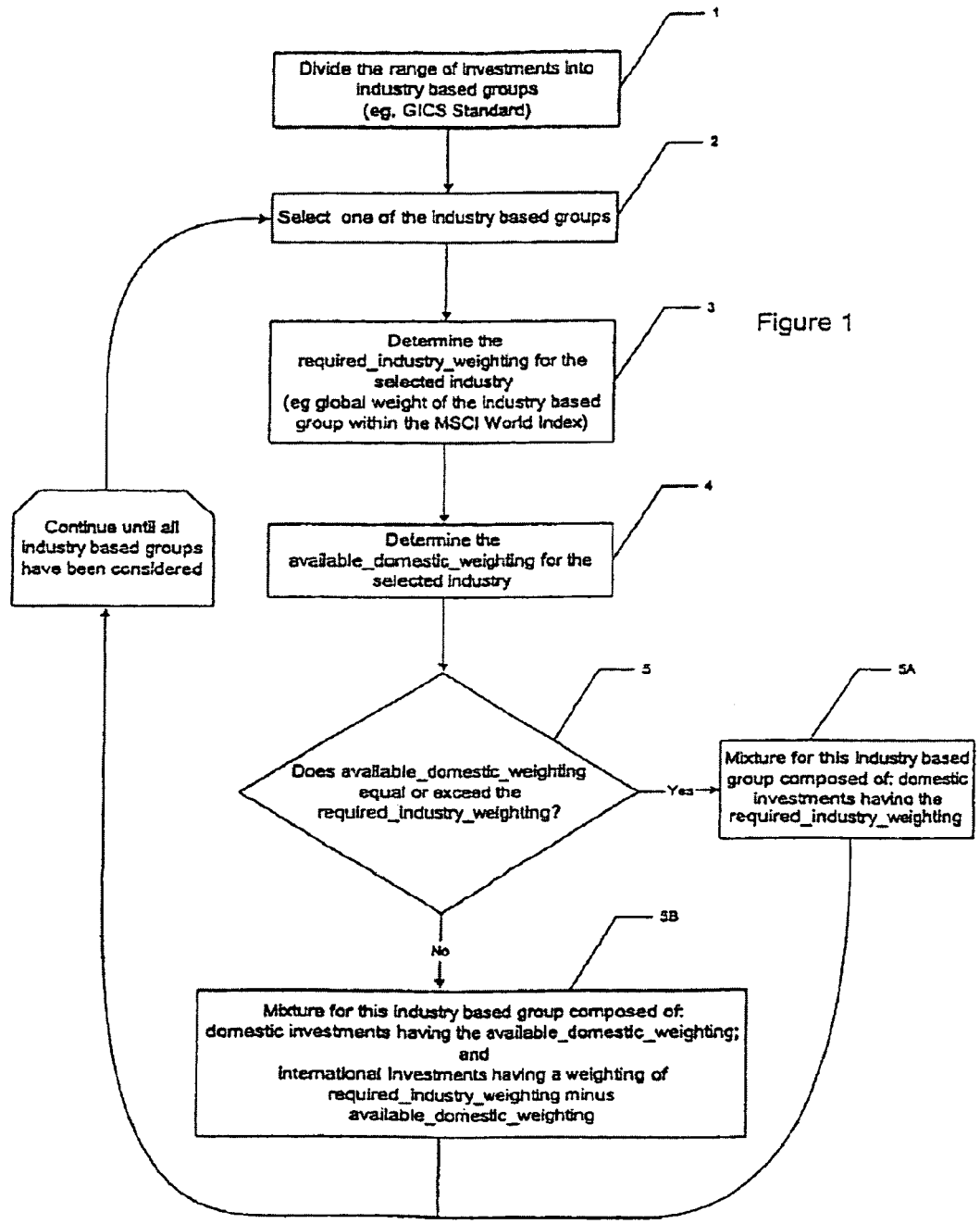
FIG. 1 is a flow chart showing a first method according to the present invention.

A method for determining weightings of an investment portfolio selected from a range of domestic and international financial investments is illustrated in FIG. 1. In this embodiment the investment portfolio consists of domestic and international tradable financial products such as financial instruments, securities, equities, shares, futures, options, warrants, bonds and/or promissory notes.

The method commences with the step 1 of dividing of the range of domestic and international financial investments into a plurality of groups, for example industry based groups. It is possible for an investor using this embodiment of the present invention to define the groups using whatever criterion is considered suitable. For the sake of example, the industry based groups of this embodiment are consistent with the Global Industry Classification Standards (GICS). This classification was introduced by Morgan Stanley Capital International (MSCI) and Standard & Poor (S&P) in 1999. The GICS classifies each financial investment into one of:

123 sub-industries, each of which belong to one of 59 industries, each of which belong to one of 23 industry groups, each of which belong to one of 10 sectors.

The industry based groups utilised in this embodiment are the 23 industry groups of the GICS, as listed in the first column of table 1 below. Some possible but non-limiting examples of suitable pre-specified groupings are the Financial Times series or National Accounts such as those prepared by the Australian Bureau of Statistics. Yet other embodiments utilise the 123 sub-industries, the 59 industries or the 10 sectors of the GICS as the basis of the industry based groups.

As used herein, the words "domestic" and the like refer to any one country or regional group of countries. The terms "international" and the like refer to all countries other than the domestic country or regional group of countries. Hence this embodiment may be utilised with specific reference to any given country or region by construing the word "domestic" to refer to that country or region. Similarly, the term "domestic" as used herein may be construed so as to refer to any set of financial investments which are to be given preferential treatment in the portfolio. In this case, the term "international" is to be construed so as to refer to those investments of interest not falling with the scope of the term "domestic". Additionally, in determining the mix of domestic and international financial investments, this embodiment of the present invention provides the necessary flexibility to incorporate changes to definitions of "domestic financial investments" and "international financial investments". For example, with increasing dual listings and the possibility of mergers of stock exchanges into one or more international exchanges, the definition of "domestic financial investments" and "international financial selected industry based group (that is for the "Energy" group). This variable represents the preferred weighting which the investor proposes to give the selected industry group within the investment portfolio. This variable is most conveniently represented as a percentage of the overall portfolio, however it will be appreciated by those skilled in the art that other representations of the weighting, such as an absolute figure representing the total funds to be invested in the selected industry based group would also suffice provided consequent minor amendments are made to the formulae used.

In this embodiment the required_industry_weightings for each of the industry based groups are based on the global weight of each industry based group within the MSCI World Index. Examples of these weightings are listed under the heading "World Weight" in column 1 of table 1 below. In other words, the required_industry_weighting for the Energy industry based group in this example is 6.9%.

Once again, however, other criteria may be used to determine the various values for the required_industry_weightings if the investor so chooses. For example, the required_industry_weighting may be determined based upon an estimate of the future consumption of investors from suppliers in the selected industry based group. This more complex alternative is an attempt to directly link investment assets with future liabilities.

TABLE 1

| Industry Group | World Weight | Australia Weight | Shortfall | Final Exposure Aust | Final Exposure Overseas |
|---|---|---|---|---|---|
| Energy | 6.9% | 2.8% | 4.1% | 2.8% | 4.1% |
| Materials | 3.8% | 15.8% |  | 3.8% |  |
| Capital Goods | 10.0% | 3.0% | 7.0% | 3.0% | 7.0% |
| Commercial Services & Supplies | 2.0% | 3.0% |  | 2.0% |  |
| Transportation | 1.0% | 2.0% |  | 1.0% |  |
| Automobiles & Components | 4.0% | 0.0% | 4.0% |  | 4.0% |
| Consumer Durables & Apparel | 2.0% | 0.0% | 2.0% |  | 2.0% |
| Hotels Restaurants & Leisure | 1.0% | 2.0% |  | 1.0% |  |
| Media | 4.0% | 15.0% |  | 4.0% |  |
| Retailing | 5.0% | 2.0% | 3.0% | 2.0% | 3.0% |
| Food & Drug Retailing | 1.0% | 5.0% |  | 1.0% |  |
| Food Beverage & Tobacco | 4.0% | 3.0% | 1.0% | 3.0% | 1.0% |
| Household & Personal Products | 1.0% | 0.0% | 1.0% |  | 1.0% |
| Health Care Equipment & Services | 1.7% | 1.0% | 0.7% | 1.0% | 0.7% |
| Pharmaceuticals & Biotechnology | 8.0% | 0.5% | 7.5% | 0.5% | 7.5% |
| Banks | 7.0% | 12.0% |  | 7.0% |  |
| Diversified Financials | 6.0% | 5.0% | 1.0% | 5.0% | 1.0% |
| Insurance | 7.0% | 7.0% |  | 7.0% |  |
| Real Estate | 1.0% | 7.0% |  | 1.0% |  |
| Software & Services | 3.0% | 1.0% | 2.0% | 1.0% | 2.0% |
| Technology Hardware & Equipment | 10.0% | 1.0% | 9.0% | 1.0% | 9.0% |
| Telecommunication Services | 6.0% | 8.0% |  | 6.0% |  |
| Utilities | 4.6% | 3.9% | 0.7% | 3.9% | 0.7% |
| TOTALS | 100.0% | 100.0% | 43.0% | 57.0% | 43.0% | investments" may change over time to reflect the changing characteristics of markets and companies. Hence the investor using this embodiment of the present invention may define domestic financial investments to be based on place of incorporation of the relevant company, or the place of the home country stock exchange.

Step 2 of this method involves selecting one of the industry based groups. Preferably a list of industry based groups is selected sequentially. For example the first industry based group to be selected in this embodiment is "Energy". It is then necessary at step 3 to define a variable referred to in this document as the required_industry_weighting for the At step 4 it is necessary to determine a variable referred to in this document as the available_domestic_weighting for the selected industry based group. In this embodiment a domestic index is used to determine the available_domestic_weighting, for example the ASX/S&P 200 index. Examples of these figures are shown in column 2 of table 1 under the heading "Australia Weight". Hence the available_domestic_weighting for the Energy industry based group is 2.8% in this example.

Of course, other sources of statistical information may be utilised in the place of the ASX/S&P200 if desired, for example other benchmark data such as the ASX/S&P300 index. For applications of this embodiment in which the "domestic" country is defined as a country other than Australia, it is possible to utilise a domestic benchmark from that country upon which to base the available_domestic_weightings.

One embodiment includes the further step whereby a figure from the domestic index is varied dependent upon pre-determined criteria prior to determining said available_domestic_weighting. For example, in one embodiment the available_domestic_weighting is a product of the figure from the domestic index and a scaling factor which is dependent upon the pre-determined criteria. More particularly, the figure extracted from the domestic index is representative of the domestic weighting within the selected industry based group., eg 2.8% for Energy. This figure is then multiplied by a factor F which is dependent upon the pre-determined criteria. That is:

available_domestic_weighting=domestic weighting*F.

In one embodiment the criteria includes combinations of the following:
- appropriateness of exposure and/or excessive exposure criteria;
- difficulty in trading equity investments associated with very small companies; appropriateness of companies associated with domestic equities;
- the place of incorporation of a company associated with a domestic equity;
- equity investments associated with companies having a place of incorporation within a pre-selected region;
- equity investments associated with companies having a home country stock exchange within a pre-selected region;
- maximum or minimum limits on either international or domestic expenditure;
- risk diversification;
- the market capitalisation of financial investments;
- an assessment of the value of an investment or a pre-selected group;
- an assessment of the growth potential of an investment;
- an assessment of any one or more of the following aspects of an investment:
  - Stock liquidity;
  - Financial risk;
  - Management risk;
  - Physical security;
  - Political risk;
  - Operational leverage (leverage to economic cycle);
  - Expected risk premium; and/or
  - Exposure to inflation.

Detailed examples of the calculation and use of the factor F to incorporate the criteria mentioned above are provided below in relation to the second embodiment whereby adaptations of the Adequate($W^G_i$, $W^D_i$) function are described. Step 5 involves a consideration as to whether the available_domestic_weighting equals or exceeds the required_industry_weighting. In the current example the available_domestic_weighting for Energy is 2.8% and the required_industry_weighting for Energy is 6.9%. Hence the available_domestic_weighting does not equal or exceed the required_industry_weighting and it is therefore necessary to proceed to step 5B. In this step a mixture of financial investments within the Energy group is calculated. The mixture consists of domestic financial investments in the Energy group having a weighting substantially equal to said available_domestic_weighting, that is 2.8%, and international financial investments having a weighting substantially equal to the required_industry_weighting (6.9%) minus the available_domestic_weighting (2.8%), that is 4.1%.

The international component of the investment portfolio (eg, the 4.1% weighting for the Energy industry based group) may be invested internationally according to the discretion of the investor. In one embodiment, however, the international investments are spread across foreign countries or regions in the same ratio as an international benchmark, for example the MSCI World Index. This approach is particularly suited to the formulation of a "standard" benchmark for the inventive method as applied to each domestic market. In yet another embodiment the weights of the international investments for each specified industry groups in each foreign country or region are determined so that the addition of all industry groups in a foreign country is sufficiently close to a specified desired exposure to that foreign country (and this applies to each foreign country). One method of selecting the desired weights for each foreign country is based on the ratio of country weights in the MSCI World Index, thus ensuring that the relativities of foreign country weights is similar to the selected international index. This method is likely to use some optimization techniques to solve the problem of selecting the weights for each industry group in each foreign country in order to obtain the desired international industry weights in each industry group whilst having the weight to each foreign country close to that desired. One such optimization method minimizes the sum of squares of deviations of weight of each foreign country from the desired weight.

After calculating the mixture for the Energy group, it is necessary to return to step 2 and select the Materials group. In step 3 it would be noted that the required_industry_weighting for Materials is 3.8%. Step 4 determines that the available_domestic_weighting for Materials is 15.8%. The comparison of step 5 determines that the available_domestic_weighting (15.8%) exceeds the required_industry_weighting (3.8%). Hence the calculation of the mixture for the Materials Group takes place at step 5A. In this step the mixture consists exclusively of domestic financial investments having a total weighting in the portfolio of 3.8%, that is, substantially equal to the required_industry_weighting.

Steps 2 to 5 (including 5A or 5B as appropriate) are repeated with regard to each of the industry based groups in turn until mixtures of financial investments for all of the industry based groups have been determined. The mixtures in each industry based group define the investment portfolio, as shown in the third column of table 1.

In some applications the investment portfolio determined by the present invention will constitute only a component of an overall portfolio which may include other separate financial investments. In this case the weightings used in the present method should represent the weightings with regard to the component to be determined by the present invention. For example a desired weighting of 4% for a particular group indicates that financial investments in that group are to constitute 4% of the component of the overall portfolio which is to be determined by the present invention.

In yet other embodiments of the invention (not illustrated) the inventive method is applied to a single group rather than to all of the groups within the pre-selected range of financial investments. This embodiment essentially involves executing steps 2 to 5 (including 5a or 5b as appropriate) once in relation to the single group of interest.

Figure 2:
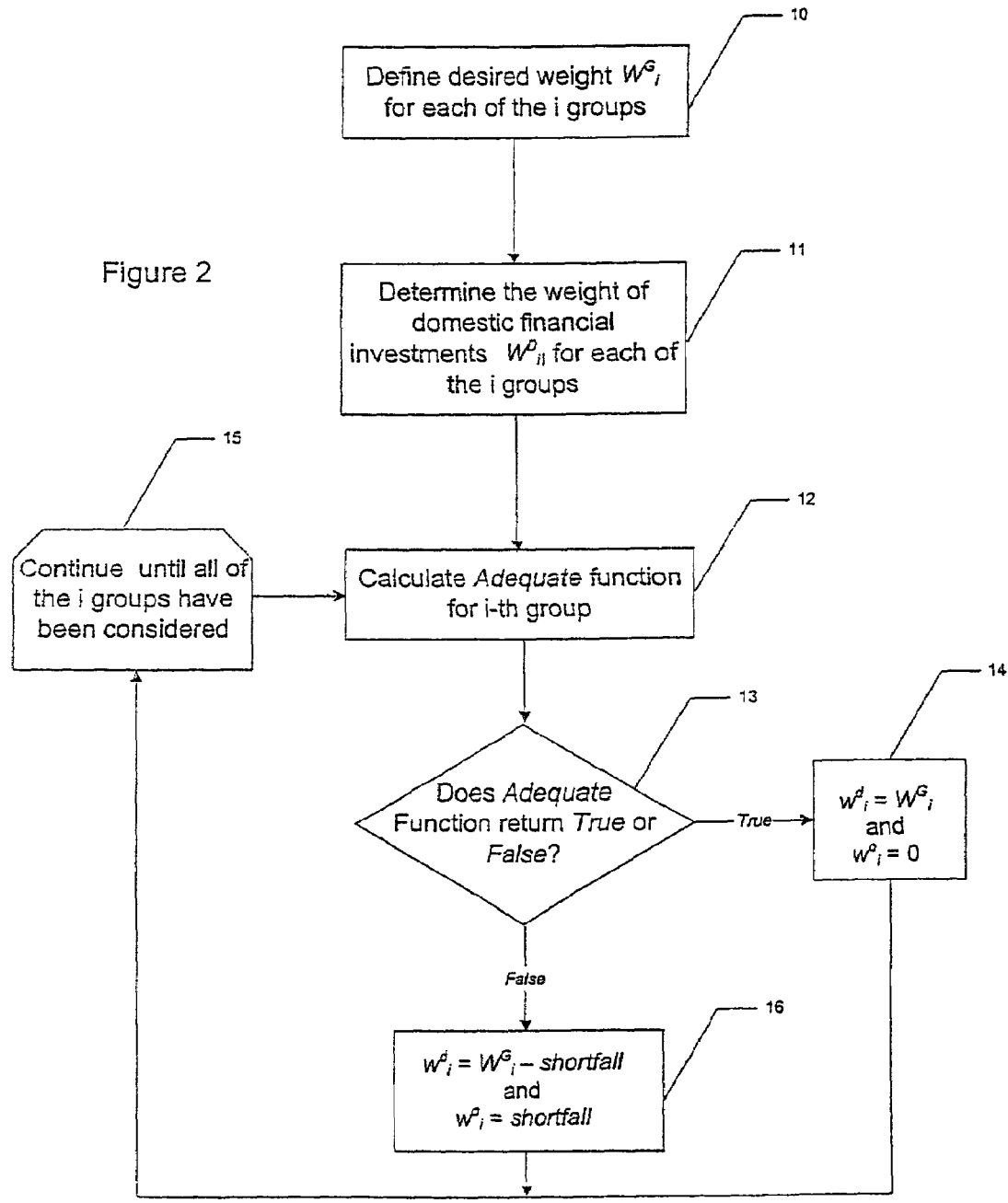
FIG. 2 is a flow chart showing a second method according to the present invention.
Figure 3:
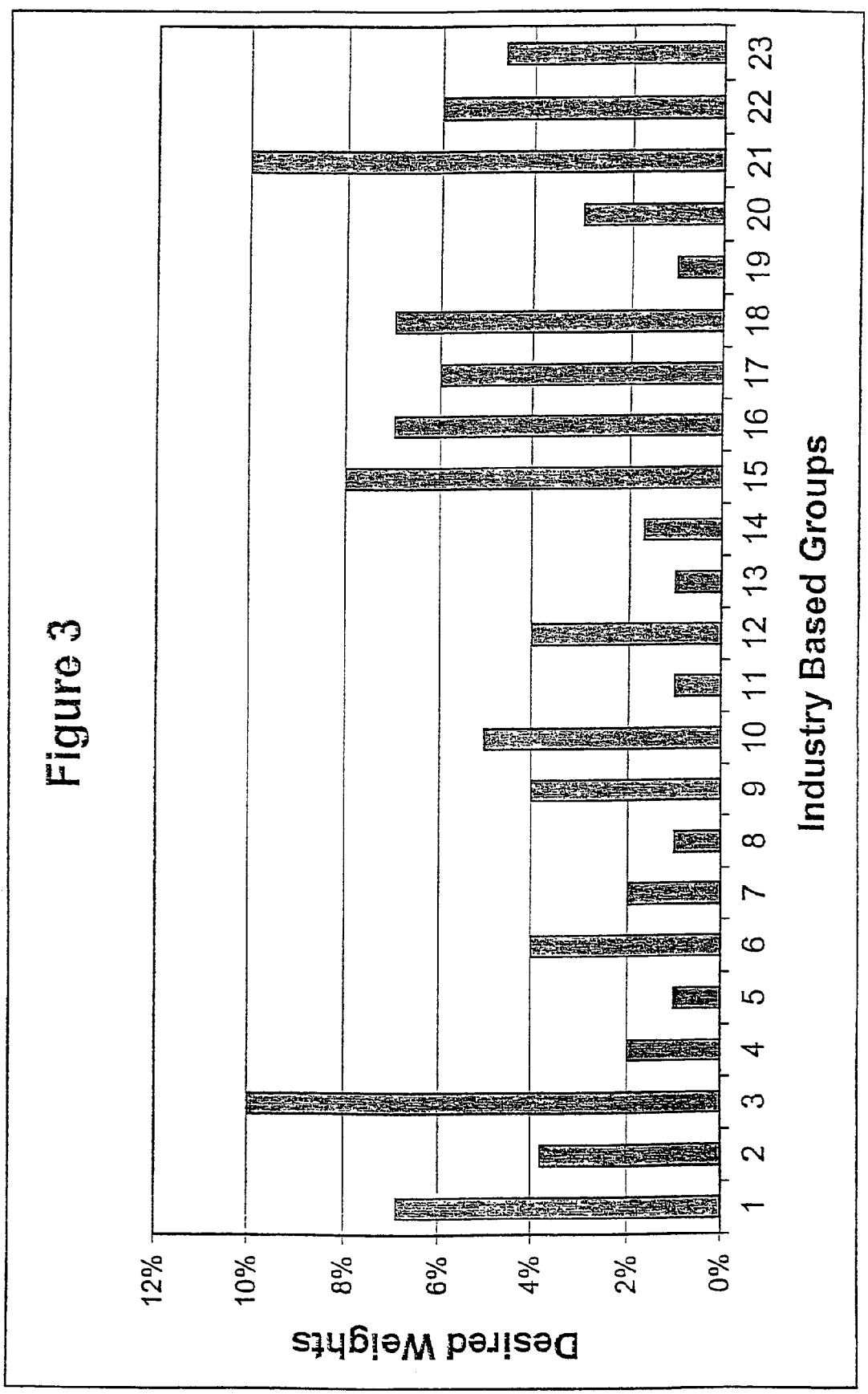
FIG. 3 is a bar graph showing a set of desired weights drawn from column 1 of table 1.

In the embodiment illustrated in FIG. 1 the inventive method is applied sequentially to each industry based group in turn, although it is not necessary that the steps be performed in this order. For example, in the second embodiment illustrated in FIG. 2, available_domestic_weightings for all of the groups are determined firstly in step 10, then the required_industry_weightings are determined for all of the groups in step 11, and finally the mixtures for each of the industry based groups are calculated at steps 12 to 16. More particularly, the second embodiment of the invention concerns a method of determining a spread of investments across i groups of financial investments, each of the groups including domestic financial investments and international financial investments. Once again for the purposes of example, this embodiment shall employ the 23 industry groups of the GICS, in other words i=23. A second method commences at Step 10 at which a desired weight ($W^G_i$) for each of the i groups is defined. Hence this step defines the following set:

$\{W^G_1, W^G_2, \ldots W^G_{23}\}$. This set is shown in chart form in FIG. 3. In each of the charts shown in FIGS. 3, 4 and 5 the industry based groups are arranged along the X-axis in accordance with the reference number i. In other words, the number 1 represents the "Energy" group, the number 2 represents the "Materials" group, and so on.

Each of the desired weightings $W^G_i$ may be calculated based upon any criteria which the investor chooses to employ. For this example the weightings $W^G_i$ are based upon the global weight of each industry based group within a global index such as the MSCI World Index, as for the first embodiment.

Figure 4:
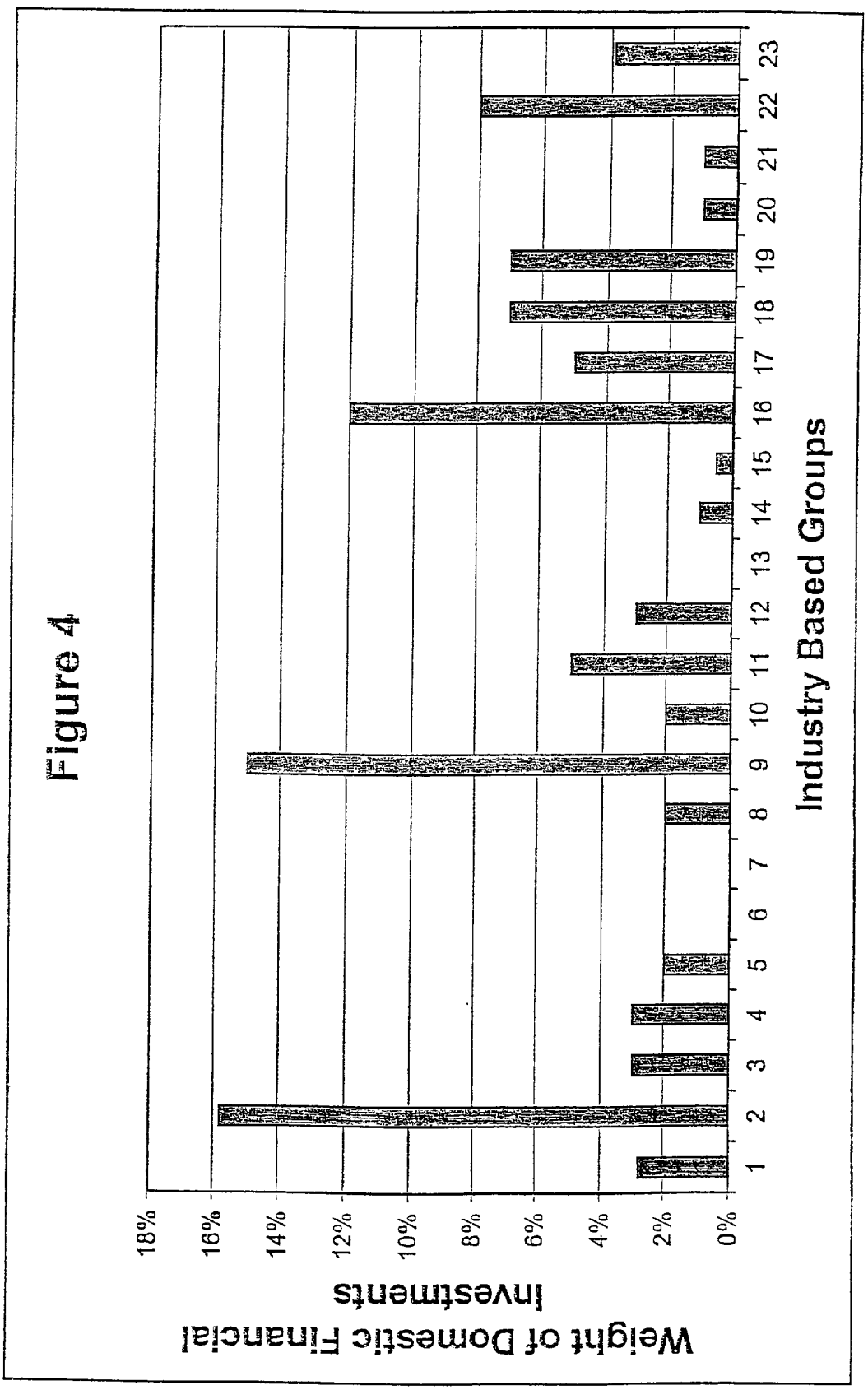
FIG. 4 is a bar graph showing a set of weights of domestic financial investments drawn from column 2 of table 1.

At step 11 the weight of domestic financial investments ($W^D_i$) for each of the i groups is determined. Hence this step defines the following set:

$\{W^D_1, W^D_2, \ldots W^D_{23}\}$. This set is shown in FIG. 4.

Each of the weightings $W^D_i$ may be calculated based upon any criteria which the investor chooses to employ. For this example the weightings $W^D_i$ are based upon a domestic index such as the ASX/S&P 200 index, as for the first embodiment.

At step 12 the Adequate($W^G_i, W^D_i$) function is calculated for the i-th group. This is a function which returns True if $W^D_i$ is adequate to meet $W^G_i$ in accordance with pre-determined criteria. Otherwise the Adequate($W^G_i, W^D_i$) function returns False. In this embodiment the values of True and False are 1 and 0 respectively, although other values may be utilised. In one embodiment the function Adequate($W^G_i, W^D_i$) is defined as follows:

| | |
|---|---|
| Adequate($W^G_i, W^D_i$) = True | if $W^G_i < W^D_i$ |
| or | |
| Adequate($W^G_i, W^D_i$) = False | if $W^G_i > W^D_i$. |

If the Adequate($W^G_i, W^D_i$) function returns True, step 13 directs the method to step 14 at which the domestic weight ($w^d_i$) and the international weight ($w^o_i$) for the i-th group is calculated as follows:

$$w^d_i = W^G_i$$

and $$w^o_i = 0.$$

If the Adequate($W^G_i, W^D_i$) function returns False, step 13 directs the method to step 15 at which the domestic weight ($w^d_i$) and the international weight ($w^o_i$) for the i-th group is calculated as follows:

$$w^d_i = W^G_i - \text{shortfall}$$

and $$w^o_i = \text{shortfall}.$$

An alternative method of determining the appropriate domestic weighting is by adapting the Adequate($W^G_i, W^D_i$) function to take into account other criteria, for example the appropriateness of exposure and/or excessive exposure. Some examples of such adaptation involve a modification of the equation for $w^d_i$ when the function Adequate() is False by incorporating a scaling factor, F, as follows:

$w^d_i$=Minimum($W^G_i, W^D_i*F$) if Adequate($W^G_i, W^D_i$)= False where $1 \geq F \geq 0$, and F is a function relating to the adoption of the determination of adequacy. Such modifications can be implemented using the alternate definition of Adequate(), or in conjunction with the definition in the above embodiment. Additionally, Adequacy() and the determination of $w^d_i$ may combine a number of aspects of adequacy in which case a method for combining the various aspects of Adequacy() would apply. An example of a method for combining the various aspects of Adequacy() would be to apply each aspect one at a time, ie obtain the greatest weight for the domestic industry groups which satisfy all the adequacy criteria. It is noted that some of the factors addressed by these adaptations may alternatively be factored into the determination of the available domestic weighting in the manner set out above whereby the domestic weighting is multiplied by the factor F.

The function Adequate($W^G_i, W^D_i$) may be adapted to take into account difficulty in trading equity investments associated with very small companies. For example, one may consider that the liquidity of a company, as measured by the average daily trading volume over the previous year, is inadequate if it is less than a specified value for each stock. The specified value for each stock could, for example, relate to the trading volume expected from typical cash flows into or out of the investment portfolio. In this example, if we determined that 30% of the companies in the industry group being considered have inadequate liquidity, then we could specify

| | |
|---|---|
| F = (1 − percent of illiquid companies), | eg 70% |
| Adequate($W^G_i, W^D_i$) = False | if $W^D_i * F < W^G_i$ | and obtain the domestic industry group from those companies which meet the liquidity requirements.

The function Adequate($W^G_i, W^D_i$) may be adapted to take into account appropriateness of companies associated with domestic equities. For example, if the domestic companies in an industry group have business activities which are in a very narrow field, then they could be considered inadequate. An example would be if the domestic pharmaceutical companies produced medicines in a very specialist and narrow field of use within the community, eg anti rejection drugs. In this adaptation of Adequate, Adequate($W^G_i, W^D_i$)=False if industry coverage of $W^D_i$ is sufficiently less than industry coverage of $W^G_i$ and F is a function of the degree of the coverage of the industry group from the available domestic companies, eg if the domestic companies only cover 40% of the breadth of activities of the industry group, then F is set equal to 40%. Alternatively one may need to further subdivide this industry group into industries and sub-industries and apply adequacy rules to those groups.

The function Adequate($W^G_i, W^D_i$) may be adapted to take into account the place of incorporation of a company associated with a domestic equity, for example the function may be adapted to favour equity investments associated with companies having a place of incorporation within a pre-selected region or to favour equity investments associated with companies having a home country stock exchange within a pre-selected region. If we determine that F % of companies in an industry group have the appropriate place of incorporation, then we could specify Adequate($W^G_i$, $W^D_i$)=False if $W^D_i * F < W^G_i$ and obtain the domestic industry group from those companies which meet the place of incorporation requirements.

The function Adequate($W^G_i$, $W^D_i$) may be adapted to take into account risk diversification. For example, if inclusion of international industry groups significantly lowers the risk of the investment portfolio, then the domestic exposure could be reduced. This will possibly occur for those industry groups that are less subject to globalisation factors. Risk has many definitions, and an example is volatility of returns. An adoption to the formulation of Adequate() would be Adequate($W^G_i$, $W^D_i$)=False if Risk($W^G_i$) is sufficiently less than Risk($W^D_i$)

and F is proportional to the degree of the risk reduction arising from the additional international exposure. The functional form of F depends on one's risk tolerance, and those skilled in the art of investing will have their own "functional" forms.

The function Adequate($W^G_i$, $W^D_i$) may be adapted to take into account the market capitalisation of financial investments, for example the investor may choose to favour, say, large companies in comparison to small and medium sized companies. For example, if we determine that F % of companies in an industry group are in the required market capitalisation range (eg in the Top 50% of the market) then we could specify Adequate($W_{Gi}$, $W^D_i$)=False if $W^D_i * F < W^G_i$ and obtain the domestic industry group exposure from those companies which meet the market capitalisation requirements.

The function Adequate($W^G_i$, $W^D_i$) may be adapted to take into account an assessment of the value of an investment or a pre-selected group, for example an investor may choose to favour a particular company or industry based group. For example, if inclusion of a domestic industry group lowers the assessment of value of an investment portfolio, then the domestic exposure could be reduced. Investment managers assess value in a multitude of ways, but they generally relate to the expectations of the future return from an investment. If we denote Return() to reflect an assessment of expected return of an investment, then an adaptation to the formulation of Adequate() would be Adequate($W^G_i$, $W^D_i$)=False if Return($W^G_i$) is sufficiently less than Return($W^D_i$)

and F is a function where F is smaller for a greater degree of the increase in Return() arising from inclusion of the additional international exposure. The form of the function Return() depends on one's risk tolerance, and those skilled in the art of investing will have their own "functional" forms. One common form is to risk adjust the returns as follows Return( )=Expected Return( )-(Risk Tolerance)*Variance of Expected Return( ).

The function Adequate($W^G_i$, $W^D_i$) may be adapted to take into account an assessment of any one or more of the following aspects of an investment:

Stock liquidity
Financial risk
Management risk
Physical security
Political risk
Operational leverage (leverage to economic cycle)
Expected risk premium or
Exposure to inflation Examples of application of these aspects would follow the examples given for the adoption of adequacy for market capitalisation, risk or return considerations.

The function Adequate($W^G_i$, $W^D_i$) may be adapted to take into account an assessment of the growth potential of an investment. Examples of application of the aspect would follow the example for return considerations.

Finally, the function Adequate($W^G_i$, $W^D_i$) and/or the value of shortfall may be adapted to take into account maximum or minimum limits on either international or domestic expenditure, for example an investor may choose to limit the weighting of international investments to a maximum of, say, 4% in any one group. Another example of the latter type of adaptation may be implemented if an investor wishes to limit international exposure to no more than, say, 40%, in line with the current average exposure of Australian superannuation funds to international investments. In the above example, the total international exposure calculated is 43.0%. Accordingly the limit of 40% can be included in the specification of Adequacy() and shortfall. One methodology is to initially calculate the domestic and international weights as in the above table, then if the overall international weight is over 40%, scale up all the domestic weights on a pro rata basis to achieve the desired reduction in the international exposure to 40%.

Another method of limiting international exposure to a particular desired value is to only adjust the domestic weights of industry groups where there is a shortfall. For example, it may be desired to have a total domestic weight of 60% and the domestic weight in all the industry groups is 57%. If the total domestic weight of industry groups where there is a shortfall is 23.2%, it is possible to multiply the domestic weights of the industry groups where there is a shortfall by the following factor:

(desired domestic weight−(total domestic weight−total weight of domestic industry groups where there is a shortfall))/(total weight of domestic industry groups where there is a shortfall)

ie:

(60%−(57%−23.2%)/23.2% =1.13 and it is possible to decrease the international weight of those industry groups by the same absolute percentage as we increased the domestic weight to achieve a total domestic weight of 60% and thus an international weight of 40%.

In applying these adjustments, it is preferable to be mindful of industry groups where the resultant pro rata increases in the domestic weight may result in the domestic weight being greater than the global weight. If that occurs, then it is possible to set the domestic weight of that industry group to the global weight and undertake further iterations using the above pro rata adjustment. This method will thus result in a set of domestic and international weights which are subject to the structure of the industry group weights.

Similarly, if the total domestic weight is greater than a specified desired value, then similar pro rata adjustments can be used to ensure that the domestic weight is decreased.

The value of shortfall for each group i is defined as $W^G_i - W^D_i$. In other words, shortfall is the extent to which the weight of the domestic financial investments for each group ($W^D_i$) falls short of the desired weight for each group ($W^G_i$).

The method then cycles back to step 12 and the Adequate ($W^G_i$, $W^D_i$) function is calculated for the next group. This cycle is reiterated until all of the i-th groups have been considered. Hence the method defines the following two sets:

domestic weights: $\{w^d_1, w^d_2, \ldots, w^d_{23}\}$, shown as the solid components of the bars in FIG. 5; and international weights: $\{w^o_1, w^o_2, \ldots, w^o_{23}\}$ shown as the diagonally striped components of the bars in FIG. 5.

Figure 5:
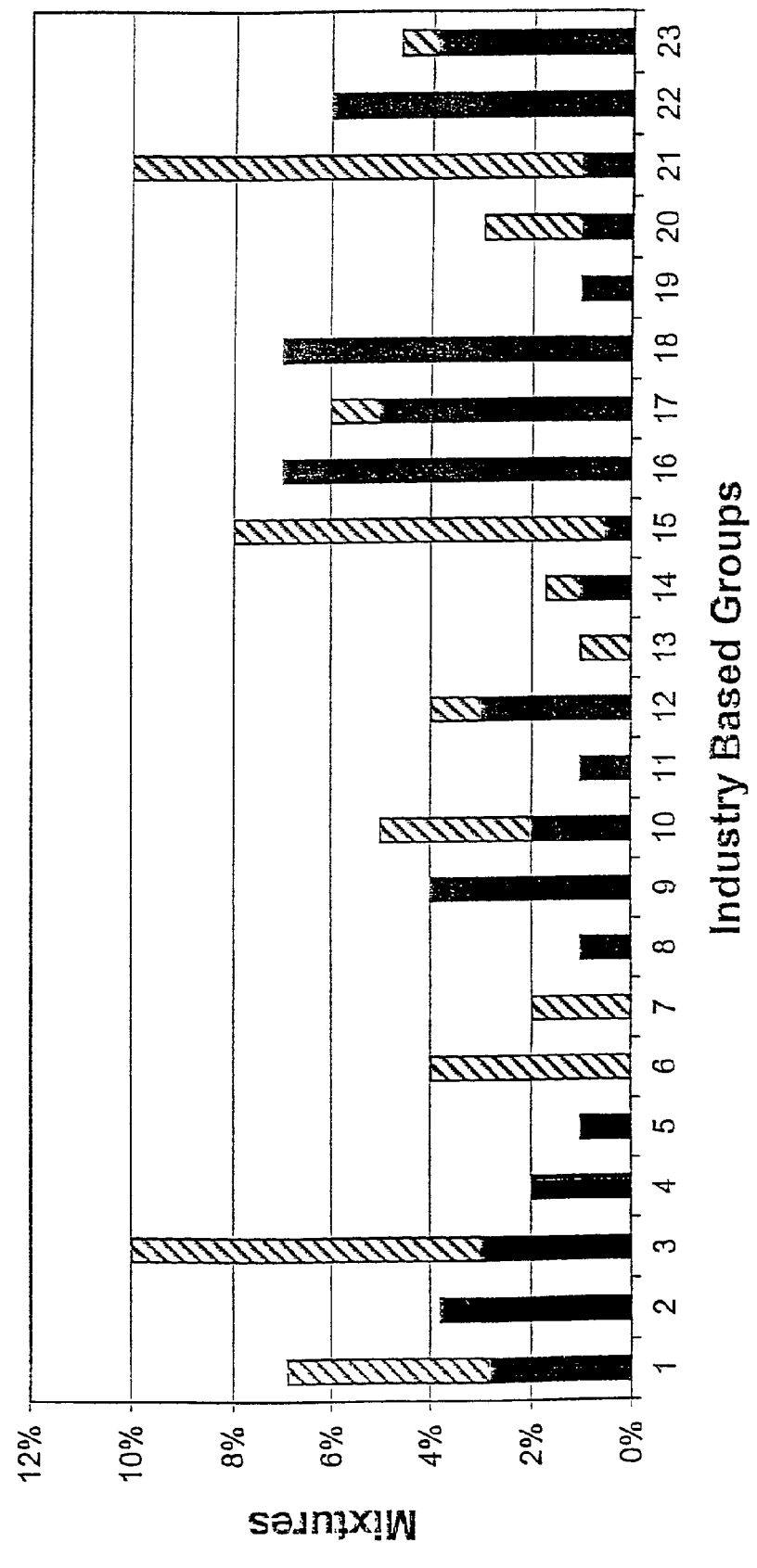
FIG. 5 is a bar graph showing a set of mixtures according to the second embodiment of the present invention drawn from column 3 of table 1.

Together, these sets define the weights of the spread of investments as given by the overall bar graph of FIG. 5. It can be seen from FIG. 5 and table 1 that in Australia banks represent 12.0% whereas they represent only 7.0% globally. Thus the domestic market provides more than adequate exposure to the "Bank" industry group and this embodiment of the present invention therefore allocates the required 7.0% to the domestic banking industry and nothing internationally. In contrast, the typical prior art technique using a fixed Australian to International ratio of 60:40 would result in a banking exposure of 10.0% (that is, 60%*12%+40%*7.0%). Hence this particular embodiment of the present invention addresses the bias to large domestic industries that is inherent in the prior art technique since dominating domestic industries are scaled down to the global weights. Further, a bias within a domestic market toward one particular company is addressed by this embodiment in a similar manner.

In the pharmaceuticals and biotechnology group the Australian market weight is very low at 0.5% compared to the global weight of 8.0%. Thus this particular embodiment of the present invention allocates 0.5% to domestic investments and the 7.5% shortfall to international investments. In comparison, the prior art 60:40 technique would allocate a total exposure to the Pharmaceutical and Technology group of 3.5% (that is, 60%*0.5%+40%*8.0%). Hence this particular embodiment of the present invention addresses situations wherein the domestic market is under-represented in a given industry based group since under-represented domestic industries are scaled up to the global weights.

This embodiment aligns exposure to industry groups available for investment worldwide. Thus the preferred embodiment delivers the diversification benefits from a reasonable spread of industry groups.

Additionally, this embodiment still obtains country diversification benefits from the spread of countries within and/or across the industry groups. The preferred embodiment explicitly obtains diversification across industry groups and implicitly obtains country diversification.

This embodiment only results in an international investment if the local market has a shortfall in an industry group. Thus this embodiment does not double up in industry groups where adequate exposure is available domestically (e.g. resources, banks). This aspect may have social and economic benefits for the domestic country.

Conversely, it is reasonable that if the domestic market does not provide adequate exposure to an industry group, then an investor should look internationally to fill that shortfall (e.g. Pharmaceuticals, Autos in the case of Australia or Energy in Japan).

It will be appreciated by those skilled in the art that both the first and second embodiments of the invention implement substantially the same method, albeit expressed in slightly different terms. In essence, each of these embodiments include the steps of:

determining a required weighting within a selected industry;

investing internationally within the selected industry only if a domestic market weight in the industry is less than the required weighting within that industry, otherwise;

investing exclusively domestically within the selected industry.

In a further embodiment computer software is adapted to perform the inventive method. Data representative of the software is stored on a computer readable medium such as a magnetic disk, magnetic tape, compact disk, hard disk, or other data storage devices known in the art. In another embodiment the software is centrally stored at an accessible site, for example on the internet, an intranet or extranet in accordance with the known Application Server Provider (ASP) model of software delivery.

Another possible embodiment of an apparatus for selecting an investment portfolio from a range of domestic and international financial investments is preferably implemented in a computing environment with software adapted to configure one or more computers to function as the apparatus. The apparatus includes a memory for storing the range in a plurality of industry based groups. Typically this memory is of the Random Access Memory (RAM) kind, however other known types of memory or data storage devices such as Read Only Memory (ROM), Electronically Programmable Read Only Memory (EPROM), magnetic data storage devices such as floppy disks, hard disks, zip drives etc and optical data storage devices such as compact disk readers (CD ROMS) and Digital Video Disk (DVD) drives etc may also fulfil this function. In some embodiments the memory is disposed remotely, for example in a remotely accessible database.

The preferred device has an input for definition of the required_industry_weighting variables for each of the industry based groups. Similarly, the available_domestic_weighting variable for each of the industry based groups is defined via the input. These variables are preferably also stored in the memory, preferably in the form of a database or the like. In one embodiment the input is manually operated. For example an operator may input the required variables into the apparatus via a keyboard, mouse or other known input device. In other embodiments the input is automatic. In one embodiment the variables are downloaded from a remote data store via a communicator, for example a modem or cable data connection. The communicator communicates with one or more financial databases, or other financial information sources, for example one or more stockmarkets. The communicator is adapted to receive data indicative of domestic weightings and global weightings for each of the industry based groups. This data is used by the processor to define the available_domestic_weightings and the required_industry_weightings respectively. In yet other embodiments these variables are automatically read from any one of the data storage devices mentioned above.

The preferred device includes a data processor which is used for determining a mixture of financial investments within each of said industry based groups in accordance with the method described above. The data processor is preferably one or more central processing units (CPU's) either including or having access to a calculator, for example a maths co-processor.

The preferred device also includes an output for communication of the mixture of financial investments within each of the industry based groups. Various outputs may be utilised, such as:

visual outputs for example monitors, liquid crystal displays (LCD's), plasma screens, printers, plotters, etc;

audible outputs for example speakers, etc electronic signals for example digital signals, audio signals, visual signals, etc; and/or a communicator, for example a modem or other data exchanging connection, adapted to automatically place buying orders in accordance with said mixtures. The buying orders are preferably received by one or more financial institutions, such as stockmarkets.

Yet another embodiment of the invention is an apparatus for investing within a selected industry. The apparatus includes an input for determining a required weighting within said selected industry. Any one or more of the inputs mentioned above are also applicable to this embodiment. The apparatus further includes investing means for investing internationally within said selected industry only if a domestic market weight in said industry is less than said required weighting within said industry. Otherwise the investing means invests exclusively domestically within said selected industry. The investing means of one embodiment is a communicator connected to a financial institution as described above. In another embodiment the investing means provides an output which is indicative of the amounts to be invested. This output then forms the basis of the investor's investments. Any one or more of the outputs mentioned above are also applicable to this embodiment.

Rather than determining a portfolio with the aim of investing in that portfolio, the invention may also be employed to determine a portfolio for use as an index, benchmark or hypothetical portfolio which may be used for, interalia, performance measurement and performance comparisons, guidance for country and/or industry exposures, performance and/or risk analysis, and other calculations and comparisons. Hence, as used in this document, the term "investment portfolio" is to be construed as including "benchmark", "index" and "hypothetical portfolio" within its scope.

Although the invention has been described with reference to specific examples, it will be appreciated that the invention may be embodied in many other forms.

What is claimed is:

1. A method for determining a weighting of an investment portfolio selected from a plurality of domestic and international financial investments, said method comprising the steps of:
   a) dividing said plurality of domestic and international financial investments into a plurality of industry based groups;
   b) selecting one of said industry based groups;
   c) determining a required industry weighting for said selected industry based group;
   d) determining an available domestic weighting for said selected industry based group;
   e) determining a mixture of financial investments within said selected industry based group, whereby said mixture consists of:
      e1) exclusively said domestic financial investments if said available domestic weighting equals or exceeds said required industry weighting; otherwise
      e2) domestic financial investments having a weighting equal to said available domestic weighting, and international financial investments having a weighting equal to said required industry weighting minus said available domestic weighting; and
   f) repeating steps b) to e) until mixtures of financial investments for all of said industry based groups have been determined, thereby forming the weighting of said investment portfolio.

2. A method according to claim 1 wherein the domestic financial investments in step e1) have a weighting equal to said required industry weighting.

3. A method according to claim 1 wherein the industry based groups of step a) are consistent with the Global Industry Classification Standards (GICS).

4. A method according to claim 1 wherein the industry based groups are consistent with a plurality of industry groups as defined in the Global Industry Classification Standards.

5. A method according to claim 1 wherein the required industry weighting determined in step c) with reference to a selected industry based group is equal to a global weight of said industry based group within a Morgan Stanley Capital International (MSCI) World Index.

6. A method according to claim 1 wherein the required industry weighting determined in step c) with reference to a selected industry based group is based upon an estimate of the future consumption from suppliers in said industry based group.

7. A method according to claim 1 wherein a domestic index is used to determine the available domestic weighting in step d).

8. A method according to claim 7 wherein a figure from said domestic index is varied dependent upon pre-determined criteria prior to determining said available domestic weighting.

9. A method according to claim 8 wherein said available domestic weighting is a product of said figure and a scaling factor which is dependent upon said pre-determined criteria.

10. A method according to claim 8 wherein said pre-determined criteria includes appropriateness of exposure and optionally excessive exposure criteria.

11. A method according to claim 8 wherein said pre-determined criteria includes difficulty in trading equity investments associated with very small companies.

12. A method according to claim 8 wherein said pre-determined criteria includes appropriateness of companies associated with domestic equities.

13. A method according to claim 8 wherein said pre-determined criteria includes the place of incorporation of a company associated with a domestic equity.

14. A method according to claim 13 wherein said pre-determined criteria includes equity investments associated with companies having a place of incorporation within a pre-selected region.

15. A method according to claim 8 wherein said pre-determined criteria includes equity investments associated with companies having a home country stock exchange within a pre-selected region.

16. A method according to claim 8 wherein said pre-determined criteria includes maximum or minimum limits on either international or domestic expenditure.

17. A method according to claim 8 wherein said pre-determined criteria includes risk diversification.

18. A method according to claim 8 wherein said pre-determined criteria includes the market capitalisation of financial investments.

19. A method according to claim 8 wherein said pre-determined criteria includes an assessment of the value of an investment or a pre-selected group.

20. A method according to claim 8 wherein said pre-determined criteria includes an assessment of the growth potential of an investment.

21. A method according to claim 8 wherein said pre-determined criteria includes an assessment of one or more of the following aspects of an investment:
   Stock liquidity;
   Financial risk;
   Management risk;
   Physical security;
   Political risk;
   Operational leverage (leverage to economic cycle);

Expected risk premium; and
Exposure to inflation.

22. A method according to claim 1 wherein said financial investments include one or more of the following:
   financial instruments;
   securities;
   equities;
   shares;
   futures;
   options;
   warrants;
   bonds;
   promissory notes; and
   other tradable financial products.

23. A method of determining a mixture of financial investments within a pre-selected industry based group, said method comprising:
   a) determining a required industry weighting for said pre-selected industry based group;
   b) determining an available domestic weighting for said pre-selected industry based group; and
   c) determining the mixture of financial investments within said pre-selected industry based group, whereby said mixture consists of:
      c1) exclusively domestic financial investments if said available domestic weighting equals or exceeds said required industry weighting; otherwise,
      c2) domestic financial investments having a weighting equal to said available domestic weighting and international equity investments having a weighting equal to said required industry weighting minus said available domestic weighting.

24. A method according to claim 23 wherein the domestic financial investments in step c1) have a weighting equal to said required industry weighting.

25. A method for determining a weighting of a portfolio selected from a plurality of domestic and international financial investments, said method comprising the steps of:
   a) dividing said plurality of domestic and international financial investments into a plurality of groups;
   b) selecting one of said groups;
   c) determining a required industry weighting for said selected group based upon investor criteria;
   d) determining an available domestic weighting for said selected group based upon statistical information;
   e) determining a mixture of financial investments within said selected group, whereby said mixture consists of:
      e1) exclusively said domestic financial investments if said available domestic weighting equals or exceeds said required industry weighting; otherwise,
      e2) domestic financial investments having a weighting equal to said available domestic weighting and international financial investments having a weighting equal to said required industry weighting minus said available domestic weighting; and
   f) repeating steps b) to e) until mixtures of financial investments for all of said groups have been determined, thereby forming the weighting of said investment portfolio.

26. A method according to claim 25 wherein said statistical information is a domestic benchmark or index.

27. A method according to claim 25 wherein said investor criteria is based upon an international benchmark or index.

28. A computer-readable storage medium containing program instructions which, when executed by a processor, cause a computer to perform a method comprising:
   a) determining a required industry weighting for said pre-selected industry based group;
   b) determining an available domestic weighting for said pre-selected industry based grourp; and
   c) determining the mixture of financial investments within said pre-selected industry based group, whereby said mixture consists of:
      c1) exclusively domestic financial investments if said available domestic weighting equals or exceeds said required industry weighting; otherwise,
      c2) domestic financial investments having a weighting equal to said available domestic weighting and international equity investments having a; weighting equal to said required industry weighting minus said available domestic weighting.

29. An apparatus for determining weightings of an investment portfolio selected from a plurality of domestic and international financial investments, said apparatus including:
   a memory for storing said plurality of domestic and international financial investments divided into a plurality of industry based groups;
   an input for definition of a required industry weighting for each of said industry based groups;
   an input for definition of an available domestic weighting for each of said industry based groups;
   a data processor for determining a mixture of financial investments within each of said industry based groups, whereby said mixture consists of:
      exclusively said domestic financial investments if said available domestic weighting equals or exceeds said required industry weighting; otherwise
      domestic financial investments having a weighting equal to said available domestic weighting and international financial investments having a weighting equal to said required industry weighting minus said available domestic weighting; and
   an output for communication of said mixture of financial investments within each of said industry based groups.

30. An apparatus according to claim 29, said apparatus being implemented in a computing environment.

31. An apparatus according to claim 30 wherein said computing environment includes program instructions adapted to configure a computer to function as said apparatus.

32. An apparatus according to claim 31 including a computer-readable storage medium for storing the program instructions.

33. An apparatus according to claim 29 wherein said input includes a communicator adapted to receive statistical financial data.

34. An apparatus according to claim 33 wherein said communicator is adapted to receive data indicative of global weightings for each of said industry based groups and to define said required industry weightings in accordance therewith.

35. An apparatus according to claim 34 wherein said communicator is adapted to receive data indicative of domestic weighting for each of said industry based groups and to define said available domestic weightings in accordance therewith.

36. An apparatus according to claim 29 wherein the output includes a communicator adapted to automatically place buying orders in accordance with said mixtures.

37. An apparatus for determining a mixture of financial investments within a pre-selected industry based group, said apparatus including:
   an input for definition of a required industry weighting for said pre-selected industry based group;

an input for definition of an available domestic weighting for said pre-selected industry based group;

a data processor for determining the mixture of financial investments within said pre-selected industry based group, whereby said mixture consists of:

exclusively said domestic financial investments if said available domestic weighting equals or exceeds said required industry weighting; otherwise, domestic financial investments having a weighting equal to said available domestic weighting and international equity investments having a weighting equal to said required industry weighting minus said available domestic weighting; and an output for communication of said mixture of financial investments.

38. An apparatus for determining weightings of an investment portfolio selected from a plurality of domestic and international financial investments, said apparatus including:

a memory for storing said plurality of domestic and international financial investments divided into a plurality of groups;

an input for defining a required industry weighting for each of said groups;

an input for defining an available domestic weighting for each of said groups; a data processor for determining the mixture of financial investments within each of said groups, whereby said mixture consists of:

exclusively said domestic financial investments if said available domestic weighting equals or exceeds said required industry weighting; otherwise, domestic financial investments having a weighting equal to said available domestic weighting and international financial investments having a weighting equal to said required industry weighting minus said available domestic weighting; and an output for communication of said mixture of financial investments within each of said groups.

39. A computer-implemented method for managing investments including domestic and international financial investments represented by companies and divided into business sectors based on a type of business associated with each company, comprising:

selecting a first value associated with a portion of an investment portfolio designated to a business sector and representing an international share of business associated with the business sector; and determining an investment plan for at least the portion of the investment portfolio based on a relationship between the first value and a second value representing a domestic share of business associated with the business sector;

wherein determining an investment plan, includes:

(i) exclusively selecting domestic financial investments for the investment plan when the second value is equal or exceeds the first value; otherwise, (ii) selecting for the investment plan domestic financial investments having a weighting equal to the second value and international financial investments having a weighting equal to a difference between the first value and the second value.

* * * * *

UNITED STATES PATENT AND TRADEMARK OFFICE
CERTIFICATE OF CORRECTION

PATENT NO. : 7,421,405 B2  
APPLICATION NO. : 09/991914  
DATED : September 2, 2008  
INVENTOR(S) : Douglas James Little et al.

Page 1 of 1

It is certified that error appears in the above-identified patent and that said Letters Patent is hereby corrected as shown below:

On the title page, item (57), line 6, "reguired" should read --required--.

On the title page, item (57), line 9, "reguired" should read --required--.

In claim 28, column 20, line 13, "a; weighting" should read --a weighting--.

Signed and Sealed this

Second Day of December, 2008

JON W. DUDAS  
*Director of the United States Patent and Trademark Office*